United States Patent [19]

Sideman

[11] Patent Number: 5,601,929
[45] Date of Patent: Feb. 11, 1997

[54] FLOOR COVERING HAVING A HIGHLY FILLED TERPOLYMER INK

[75] Inventor: Carl E. Sideman, Lititz, Pa.

[73] Assignee: Armstrong World Industries, Inc., Lancaster, Pa.

[21] Appl. No.: 532,286

[22] Filed: Sep. 19, 1994

Related U.S. Application Data

[63] Continuation of Ser. No. 78,487, Jun. 21, 1993, abandoned, which is a continuation of Ser. No. 561,688, Aug. 1, 1990, abandoned.

[51] Int. Cl.$^6$ ................................................ B32B 27/30
[52] U.S. Cl. ..................... 428/518; 428/520; 428/542.2; 428/908.8
[58] Field of Search ............................. 428/44, 67, 363, 428/518, 520, 542.2, 908.8

[56] References Cited

U.S. PATENT DOCUMENTS

| | | | |
|---|---|---|---|
| 4,242,390 | 12/1980 | Nemeth | 428/47 |
| 4,409,280 | 10/1983 | Wiley et al. | 428/203 |
| 4,605,584 | 8/1986 | Herr, Jr. et al. | 428/142 |
| 4,735,985 | 4/1988 | Oien | 524/315 |
| 4,756,951 | 7/1988 | Wang et al. | 428/204 |

OTHER PUBLICATIONS

Product Brochure entitled "Mearl Pearlescent Pigments for use in Printing Gravure and Flexographic Printing". Published by The Mearl Corporation as Technical Information.
Rieger, C. J., "Use of Non–Metallic Pearlescent Pigments to Achieve Metallic Appearance". Presented at 37th SPE Annual Technical Conference in New Orleans, May 9, 1979.
Product Brochure entitled "UCAR Solution Vinyl Resins for Coating". Published by Union Carbide, 1988, pp. 1–4, 7, 8, 10, 26–31, 35.

*Primary Examiner*—D. S. Nakarani

[57] ABSTRACT

The incorporation of a vinyl chloride/vinyl acetate/maleic acid terpolymer in the pigment particle containing decorative layer of a floor covering improves the cohesive strength of the pigmented decorative layer and adhesion of the decorative layer to the adjacent layers. The use of this vinyl terpolymer as the binder in the printed or coated decorative layer imparts improved bond strength particularly with platey pigments like pearlescents and metallics or in highly filled decorative layers containing titanium dioxide or other pigments.

11 Claims, No Drawings

FLOOR COVERING HAVING A HIGHLY FILLED TERPOLYMER INK

This is a continuation of application Ser. No. 78,487 filed on Jun. 21, 1993, now abandoned, which is a continuation of application Ser. No. 561,688 filed on Aug. 1, 1990, now abandoned.

BACKGROUND OF THE INVENTION

The invention relates to floor coverings having a decorative layer with improved cohesion within the decorative layer and improved adhesion of the decorative layer to the adjacent layers. More particularly, the decorative layer includes a vinyl chloride/vinyl acetate/maleic acid terpolymer binder in the decorative layer.

PRIOR ART

Floor coverings of the prior art include vinyl sheet, vinyl tile, linoleum, and rubber tile. Such floor coverings include thermoplastic and thermosetting wear layers. The exposed surface which is subjected to traffic wear may be a clear wear layer. Preferred wear layers include crosslinked thermosetting layers such as polyurethane or thermoplastic layers such as rigid or plasticized polyvinyl chloride or vinyl plastisols. Other floor coverings do not include wear layers but have through-color decorative layers which are exposed to the traffic. The base layer may be a conventional vinyl floor tile material, a conventional felt-backed vinyl composition sheet, plastisol saturated glass or solid vinyl plastisol.

The binder resin of choice for use in decorative layers of floor coverings has been an hydroxyl-modified vinyl chloride/vinyl acetate resin such as VAGH resin sold by Union Carbide. Coatings and inks based on this hydroxyl-modified vinyl resin have good adhesion to wash primers, metals, wood, and many plastic substrates. Under most manufacturing conditions, the hydroxyl-modified vinyl resin decorative layers have provided adequate cohesion within the decorative layer and adhesion between the decorative layer and base or wear layer. This cohesion and adhesion generally have proved to be sufficient to prevent delamination of the floor covering. However, with high filler loadings, particularly pearl platelets, delamination problems have occurred. The cohesion and adhesion have been improved by lowering the filler content of the decorative layer and increasing the vinyl binder content of the tile base. However, these solutions have not been entirely adequate.

SUMMARY OF THE INVENTION

Therefore, it is an object of the present invention to provide a decorative layer having improved cohesion and adhesion.

A further object is to improve the cohesion and adhesion sufficiently to permit increased filler loadings in the decorative layer which is cohesively stronger than the base to which it is adhered so that delamination failure occurs in the base.

These objects have been met by a decorative layer having a vinyl chloride/vinyl acetate/maleic acid terpolymer binder resin. The cohesion within the decorative layer and adhesion between the decorative layer and surrounding layers (i.e., wear and base layers) are such that upon being delaminated the failure occurs in the base near the interface of the decorative layer and base whereby portions of the base are separated from the base layer and are adhered to the decorative layer while substantially no decorative layer composition adheres to the base layer.

DETAILED DESCRIPTION

Low wear layer adhesion has occurred in tile patterns printed with an overall .pearl layer. The cohesion of the decorative layer and adhesion between layers are tested in a 180° delamination test on a tensile testing machine. A 1"×6" or 2"×6" specimen is cut with the long dimension in the machine direction. After conditioning in 23° C. water for ten minutes, the backing is scored about one inch from the end and peeled back 1½ to 2". The sample is mounted in the tensile tester with a 1" jaw distance and pulled at a machine speed of 6" min with a 1"/min chart speed. The results are reported in average pounds pull per inch width.

If delamination occurs within the decorative layer, the numerical result of the delamination test is a measure of cohesion within the decorative layer, and the adhesion between the decorative layer and the base layer, to which the decorative layer is adhered, is greater than the cohesion within the decorative layer. If the delamination occurs at the surface of the decorative layer adjacent the base layer, the numerical result of the delamination test is a measure of the adhesion between the decorative layer and the base layer, and the cohesion within the decorative layer is greater than the adhesion between the layers or the cohesion within the base layer.

The ink extender solutions used were made by adding the various vinyl resins to an isopropyl acetate solvent containing dibutyl tin maleate stabilizer. This was done by slowly adding the vinyl resin to the solvent and stabilizer in a high shear mixer until the resin was dissolved. While still mixing, an acrylic resin was added and mixed thoroughly. The weight percent of the components of the extender solutions used in the Examples is set forth in Table 1.

TABLE 1

| Extender | Vinyl Resin | | | Isopropyl Acetate | Acryloid A101[1] | Dibutyl Tin Maleate | Percent Nonvolatiles |
|---|---|---|---|---|---|---|---|
| | VMCC | VAGH | VAGD | | | | |
| 1 | 14.5 | — | — | 80.2 | 5.0 | 0.3 | 16.8 |
| 2 | 18.6 | — | — | 74.7 | 6.4 | 0.3 | 21.5 |
| 3 | — | 14.5 | — | 80.2 | 5.0 | 0.3 | 16.8 |
| 4 | — | — | 14.5 | 80.2 | 5.0 | 0.3 | 16.8 |

[1]Acrylic resin supplied at 40% solids in methyl ethyl ketone (made by Rohm and Haas Company)

The inks were made by dispersing the pearlescent pigment into the extender with a low shear mixer and additional isopropyl acetate solvent was added to adjust to printing viscosity. Table 2 sets forth the weight percent of the ink components for Examples 1 and 2.

TABLE 2

| Ink Sample | Ink Extender Solution | | Pearl[4] (Parts by wt.) | Additional Isopropyl Acetate Solvent (Parts by wt.) | Viscosity of Extender Pearl, and Additional Solvent[5] |
|---|---|---|---|---|---|
| | Extender No. (Type) | (Parts by w¹.) | | | |
| 1 | 1(VMCC[2]) | 100 | 13.65 | — | 15" |
| 2 | 2(VMCC) | 100 | 17.65 | 33 | 12" |
| 3 | 2(VMCC) | 100 | 13.65 | 26 | 12" |
| C1 | 3(VAGH[3]) | 100 | 13.65 | 12 | 20" |
| C2 | 4(VAGD[3]) | 100 | 13.65 | — | 15" |
| C3 | 3(VAGH) | 100 | 13.65 | 26 | 12" |

[2]Vinyl chloride/vinyl acetate/maleic acid terpolymer resin from Union Carbide
[3]Hydroxyl-modified vinyl chloride/vinyl acetate resin from Union Carbide
[4]Superfine pearl platelets from the Mearl Corporation
[5]Measured on a #3 Zahn Cup Viscometer The ink compositions of Examples 1 and 2 were applied in the laboratory to a 4-mil high modulus vinyl film, laminated under about 80 psi at about 310° F. for about 15 seconds to a vinyl tile base having a thickness of about 73 mils. These test samples were made only 1" in width and were tested for 180° delamination on an Instron tensile tester.

EXAMPLE 1

As shown in Table 3, the vinyl chloride/vinyl acetate/maleic acid terpolymer resin (VMCC) showed a 21% improvement over the prior art system which consisted of a hydroxyl-modified vinyl chloride/vinyl acetate copolymer resin (VAGH) at the same percent pearl in the dried ink film (6.9 pounds per one inch width versus 5.7 pounds per one inch width). Even with a higher percent pearl in the wet ink, Sample 1 gave superior 180° delamination test results versus Sample C1.

TABLE 3

| Ink Sample | Pearl Type | Extender No. (Type) | % Pearl in Wet Ink Film[6] | % Pearl in Dry Ink Film[6] | Pounds Pull Per 1" Width |
|---|---|---|---|---|---|
| 1 | Mearl[7] Superfine | 1(VMCC) | 12.0 | 44.8 | 6.9 |
| C1 | Mearl[7] Superfine | 3(VAGH) | 10.9 | 44.8 | 5.7 |
| C2 | Mearl[7] Superfine | 4(VAGD) | 12.0 | 44.8 | 4.9 |

[6]Weight percent
[7]Mearl Corporation

Sample C2 was made with a lower molecular weight hydroxyl-modified vinyl chloride/vinyl acetate resin (VAGD) than the VAGH used in Sample C1. At the same percent pearl pigment in the wet and dry ink, Sample 1 gave superior 180° delamination test results versus Sample C2.

EXAMPLE 2

The results of Example 1 were confirmed in a similar test reported in Table 4.

TABLE 4

| Sample | Pearl Type | Extender No. (Type) | % Pearl in Wet Ink Film | % Pearl in Dry Ink Film | Pounds Pull Per 1" Width |
|---|---|---|---|---|---|
| 3 | Mearl Superfine | 2(VMCC) | 9.8 | 38.8 | 8.4 |
| 2 | Mearl Superfine | 2(VMCC) | 11.7 | 45.1 | 8.0 |
| C3 | Mearl Superfine | 3(VAGH) | 9.8 | 44.8 | 4.5 |

As shown in Example 2, the pearl ink extender of the present invention has been found to give improved cohesion and adhesion even with increased filler loading. The present extender (extender 2) has resin solids of 21.5% versus 16.8% for the prior art extender (extender 3). The solvent reduction to print viscosity is the same for Samples 3 and C3 due to the lower molecular weight resin used in the present extender. The combination of better cohesive properties of the present vinyl solution resin (VMCC) plus the higher solids gave superior cohesion and adhesion results compared to the prior art extender made with VAGH. On increasing the pearl pigment to 11.7% in Sample 2 to yield a % pearl in the dry ink of about 45, the cohesion and adhesion still remained high at 8.0 pounds when compared to Sample C3.

EXAMPLE 3

The present invention can be used to improve the appearance of metallic pearl pigments. Increased pearl pigment concentration in the ink, while maintaining good interlaminar adhesion, gives a more intense metallic pearlescent effect to the finished flooring product. Table 5 sets forth the type and parts by weight of ink extender and pearl pigment, parts by weight of additional solvent, ink viscosity, percent pearl in wet and dry compositions, and results of the 180° delamination test.

TABLE 5

| Ink Sample | Ink Extender Solution (Parts by wt.) Extender No. (Type) 2(VMCC) | 3(VAGH) | Pearl Pigment (Parts by wt.) Silver[8] | Gold[9] | Additional Isopropyl Acetate Solvent (Parts by wt.) | Ink Viscosity (in sec on #3 Zahn) | Percent Pearl in Wet Composition | Percent Pearl in Dry Composition | Pounds Pull per 1" Width |
|---|---|---|---|---|---|---|---|---|---|
| 4A  | 100 |     | 13.65 |       | 40 | 12 | 8.9%  | 38.9% | 7.0 |
| 4B  | 100 |     | 17.65 |       | 40 | 12 | 11.2% | 45.1% | 6.4 |
| 4C  | 100 |     | 21.65 |       | 40 | 12 | 13.4% | 50.2% | 5.1 |
| C4A |     | 100 | 13.65 |       | 40 | 17 | 8.9%  | 44.8% | 4.5 |
| C4B |     | 100 | 17.65 |       | 40 | 18 | 11.2% | 51.2% | 3.4 |
| C4C |     | 100 | 21.65 |       | 40 | 23 | 13.4% | 56.3% | 3.1 |
| 4D  | 100 |     |       | 13.65 | 40 | 11 | 8.9%  | 38.9% | 6.9 |
| 4E  | 100 |     |       | 17.65 | 40 | 11 | 11.2% | 45.1% | 6.2 |
| 4F  | 100 |     |       | 21.65 | 40 | 12 | 13.4% | 50.2% | 6.1 |
| C4D |     | 100 |       | 13.65 | 40 | 16 | 8.9%  | 44.8% | 4.1 |
| C4E |     | 100 |       | 17.65 | 40 | 17 | 11.2% | 51.2% | 3.9 |
| C4F |     | 100 |       | 21.65 | 40 | 18 | 13.4% | 56.3% | 3.7 |

[8]Silver A3, a mixture of Afflair pearlescent pigments sold by Functional Materials, Inc. of Paramus, N.J.
[9]Gold G4, a mixture of Afflair pearlescent pigments sold by Functional Materials, Inc. of Paramus, N.J.
Afflair is a trademark of E. M. Industries, Inc.

Samples 4C and 4F were at a much higher percent pearl pigment loading in both the wet and dry ink when compared with Samples C4A and C4D. Yet Samples 4C and 4F with the present ink extender gave higher 180° delamination test results.

In each of the Examples 1 to 3, the 1" wide comparative samples all yielded less than 6 lbs/1 inch in the 180° delamination test. The comparative samples delaminated within the decorative layer whereby some of the pearl pigment remained adhered to the base layer. Therefore, the cohesion within the decorative layer was less than the adhesion between the decorative layer and the base layer. In the samples of the present invention, the failure occurred at the surface of the decorative layer adjacent the base whereby substantially none of the decorative layer composition remained adhered to the base layer. Therefore, the adhesion between the decorative layer and the base layer was less than the cohesion within the decorative layer.

Union Carbide produces a family of vinyl chloride/vinyl acetate/maleic acid terpolymers including VMCH, VMCC, and VMCA. While the medium molecular weight resin was tested, the higher molecular weight and lower molecular weight resins would yield improved cohesion and adhesion.

While cohesion of the decorative layer including pearl platelets may be more critical due to the flat configurations of the platey material and improved cohesion may be more easily measured, cohesion and adhesion are improved in other highly filled decorative layers such as those including titanium dioxide particles.

The present ink extender can be used wherever ink extenders are presently used in flooring applications. The present ink extender may be used in rotogravure inks on vinyl tile and vinyl sheet goods. It can be printed directly on the flooring base or printed on film which will be adhered to the base, or printed on a release paper in a transfer process.

I claim:

1. A floor covering comprising a decorative layer and a base, said decorative layer comprising a filler and binder resin, wherein the binder resin is a vinyl chloride/vinyl acetate/maleic acid terpolymer, the decorative layer after drying has at least 43% and no greater than 53% by weight of the vinyl chloride/vinyl acetate/maleic acid terpolymer, the filler is selected from the group consisting of platey material and titanium dioxide particles, wherein the decorative layer is adhered to the base, the cohesion of the binder resin within the decorative layer being greater than the adhesion between the decorative layer and the base whereby upon being delaminated in a tensile test the floor covering fails within the base and not in the decorative layer.

2. The floor covering of claim 1 wherein the base is a polyvinyl chloride resin composition.

3. The floor covering of claim 1 wherein the base is a filled polyvinyl chloride resin composition.

4. The floor covering of claim 1 wherein the filler is a platey material.

5. The floor covering of claim 4 wherein the decorative layer comprises at least 38.8 and no greater than 50.2 weight percent of the platey material.

6. The floor covering of claim 4 wherein the platey material is a pearlescent pigment.

7. The floor covering of claim 1 wherein the vinyl chloride/vinyl acetate/maleic acid terpolymer has the following structure:

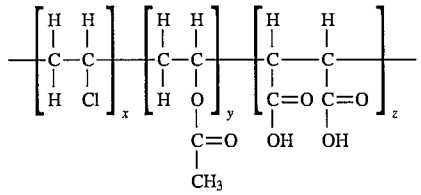

where x, y and z are such that the vinyl chloride monomer comprises from about 81 to about 86 percent by weight, the vinyl acetate monomer comprises about 13 to about 17 percent by weight, and the maleic acid monomer comprises about 1 to about 2 percent by weight.

8. A floor covering comprising a decorative layer and a base, said decorative layer consisting essentially of a filler selected from the group consisting of platey material and titanium dioxide particles and a vinyl chloride/vinyl acetate/maleic acid terpolymer binder resin.

9. The floor covering of claim 8 wherein the platey material filler is a pearlescent pigment.

10. The floor covering of claim 8 wherein the vinyl chloride/vinyl acetate/maleic acid terpolymer has the following structure:

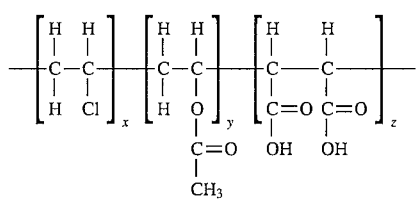

where x, y and z are such that the vinyl chloride monomer comprises from about 81 to about 86 percent by weight, the vinyl acetate monomer comprises about 13 to about 17 percent by weight, and the maleic acid monomer comprises about 1 to about 2 by weight.

11. A floor covering comprising a decorative layer and a base, said decorative layer consisting essentially of a filler selected from the group consisting of platey material and titanium dioxide particles, a vinyl chloride/vinyl acetate/maleic acid terpolymer binder resin, and an acrylic binder resin.

* * * * *